June 20, 1961  W. STELZER  2,989,033
BOOSTER MOTOR MECHANISM
Filed Aug. 8, 1958  3 Sheets-Sheet 1

INVENTOR.
WILLIAM STELZER
BY John V. Phillips
ATTORNEY

INVENTOR.
WILLIAM STELZER

United States Patent Office 2,989,033
Patented June 20, 1961

2,989,033
BOOSTER MOTOR MECHANISM
William Stelzer, Bloomfield Hills, Mich., assignor to Kelsey-Hayes Company, Detroit, Mich., a corporation of Delaware
Filed Aug. 8, 1958, Ser. No. 753,956
16 Claims. (Cl. 121—41)

This invention relates to a booster motor mechanism of the type employing lever means for transmitting hydraulic reactions from the master cylinder to the brake pedal.

A number of fluid pressure brake booster motors have been developed in which the pressure responsive units of the motors have portions relatively movable upon an increase in pressure in the master cylinder incident to energization of the motor, and in which such relative movement is utilized to rock reaction levers to transmit to the brake pedal reaction forces which are proportional to hydraulic pressures in the brake lines. A number of these devices are highly practicable and efficient, but are relatively expensive to manufacture. Such devices require adjustment, and they involve the use of counter-reaction or transition springs to delay the transmission of reaction forces to the brake pedal to provide, in effect, two stages of reaction, the first of which provides little resistance to movement of the brake pedal and the second of which provides heavier resistances, as is desirable.

An important object of the present invention is to provide a booster motor mechanism of the type referred to in which the parts are simplified and rendered more economical to manufacture and assemble.

A further object is to provide such a mechanism which eliminates the need for any adjustment of the parts to accomplish the desired results.

A further object is to provide a novel construction which permits the elimination of the usual counter-reaction or transition springs.

A further object is to provide a lever reaction motor of the type referred to wherein a portion of the pressure responsive unit is formed as a resilient diaphragm utilized in a novel manner whereby its flexing will be effective at the proper time to transmit second stage reaction forces to the brake pedal when fluid line pressures have reached the point necessary to approximately initially engage the brake shoes with the brake drums.

Other objects and advantages of the invention will become apparent during the course of the following description.

In the drawings I have shown one embodiment of the invention. In this showing:

Figure 1:
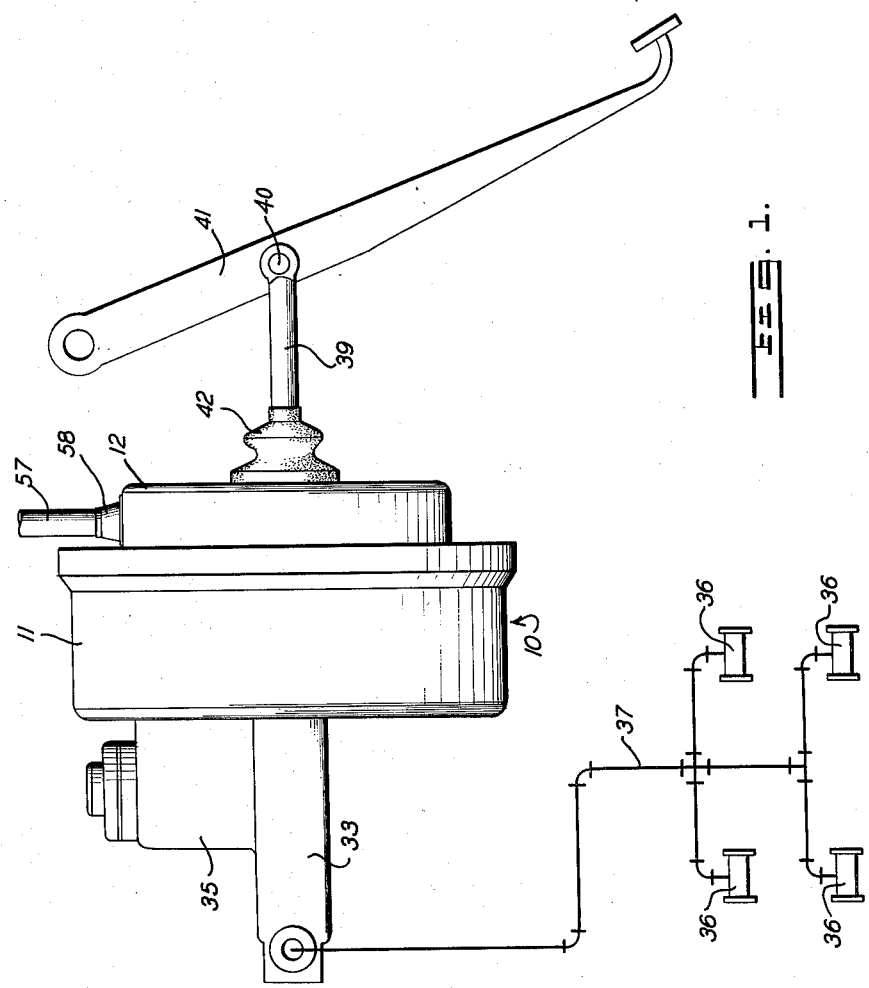
FIGURE 1 is a side elevation of the apparatus, the brake lines and wheel cylinders being diagrammatically shown.

Referring to the drawings, the numeral 10 designates the booster motor as a whole comprising casing sections 11 and 12 divided by a pressure responsive unit indicated as a whole by the numeral 13 and described in detail below, to form a constant pressure motor chamber 14, open to the atmosphere, and a variable pressure chamber 15 normally communicating with the chamber 14 and adapted to be connected to a vacuum source to energize the motor.

The pressure responsive unit 13 comprises a preferably pressed body 18 having a radially outer flange 19 against which is arranged the inner bead of a rolling diaphragm 20. A second plate 21, further described below, serves to clamp the inner bead of the diaphragm to the flange 19.

The outer bead of the diaphragm is retained between the housing sections 11 and 12 by an annular retaining ring 22, and it will be apparent that the diaphragm is adapted during operation of the motor to roll over a cylindrical flange 23 formed on the radially outer portion of the plate 21.

Arranged axially in the motor is a pedal operable hub 25 having a flange 26 over which the inner portion of the plate 21 extends to be clamped in position. Such portion of the plate 21 is engaged by a reaction plate 27, also fixed to the flange 26 and provided with a radially outer flange 28 for a purpose to be described.

The portion of the plate 21 radially outwardly of the hub 25 is resilient and is formed with concentric convolutions 30. Such portion of the plate 21 is adapted to be flexed under operating conditions referred to below.

The hub 25 is pressed into a sleeve portion 31 formed on the end of a master cylinder fluid displacing plunger 32, operable in a master cylinder 33 to generate hydraulic pressure in the usual master cylinder pressure chamber 34. The usual hydraulic fluid reservoir 35 is arranged above the master cylinder. The elements of the master cylinder are conventional and need not be referred to in detail. Fluid is supplied to the brake cylinders 36 through the usual fluid lines 37 (FIGURE 1).

Coaxially arranged in the motor is a valve housing 38 operable by a rod 39 (FIGURES 1 and 2) connected as at 40 to a brake pedal 41 preferably of the conventional depending type. A boot 42 is connected between the housing section 12 and the rod 39.

Figure 2:
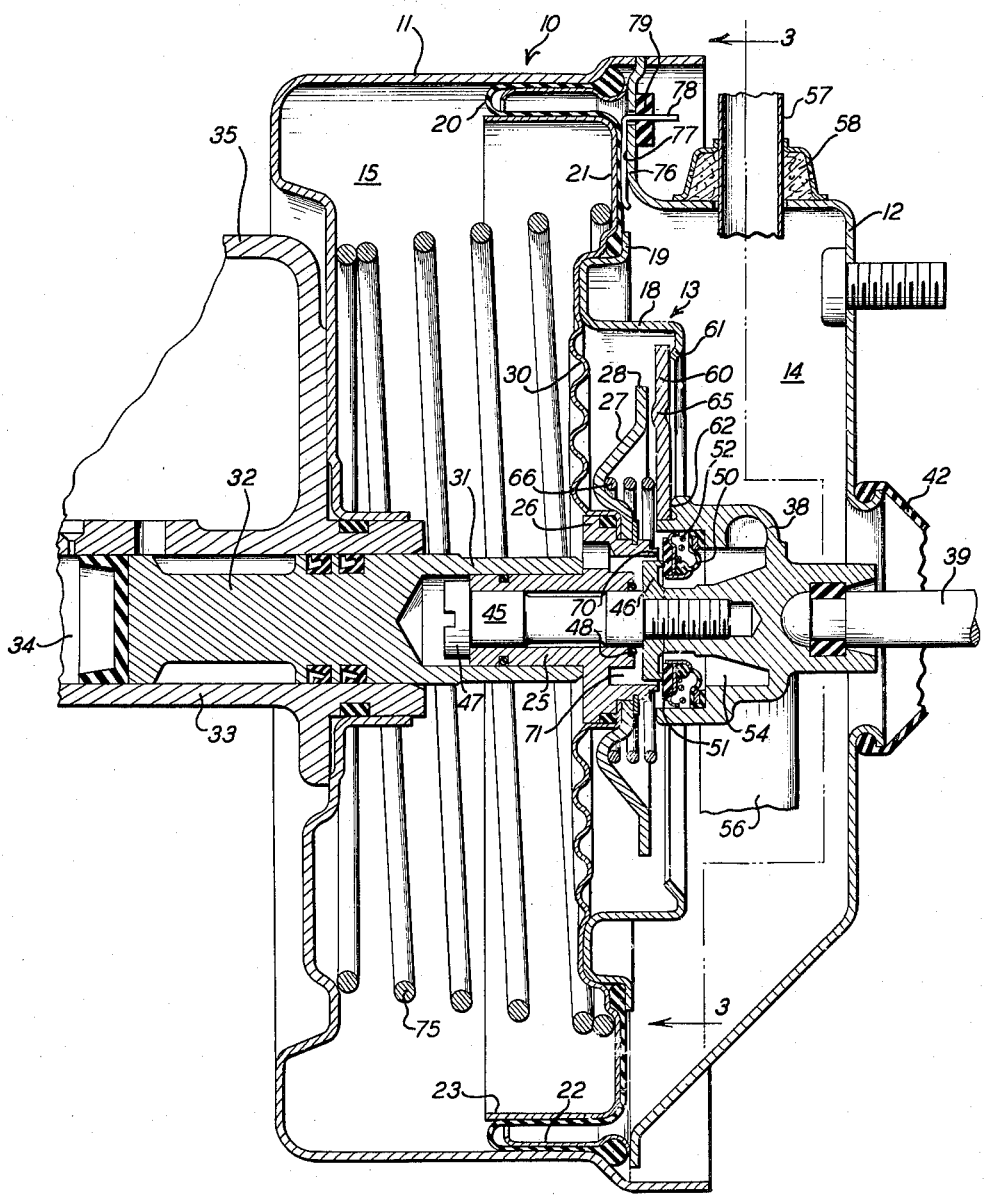
FIGURE 2 is an enlarged axial fragmentary sectional view of the booster motor unit.

A rod 45 is threaded axially into the valve housing 38 as shown in FIGURE 2 and maintains in position with respect thereto a valve seat 46. The rod 45 is slidable through the hub 25 and movement of the valve housing 38 to off position is limited by a head 47 on the rod 45 engageable with the hub 25. The right-hand end of the hub 25, as viewed in FIGURE 2, carries an O-ring 48 which projects very slightly beyond the adjacent end of the hub 25 to be engaged by the valve seat 46 upon operation of the valve mechanism.

Within the valve housing 38 is fixed the periphery of an annular diaphragm 50 carrying a floating resilient valve 51 biased to the left in FIGURE 2 by a light spring 52, this spring in the normal position of the parts maintaining the valve 51 in engagement with the seat 46.

The space within the valve 51 forms a vacuum chamber 54 communicating through a projection 55 (FIGURE 3) with a pigtail hose 56, the other end of which is connected to an elbow 57. This elbow in turn is suitably connected to a source of vacuum such as the intake manifold of the engine.

As previously stated, the motor chamber 14 is in constant communication with the atmosphere. To this end, the radially outer end of the elbow 57 is surrounded by an air cleaner 58 which serves to fix the elbow 57 in position and admits air into the chamber 14 around the elbow 57, as will be obvious.

Figure 3:
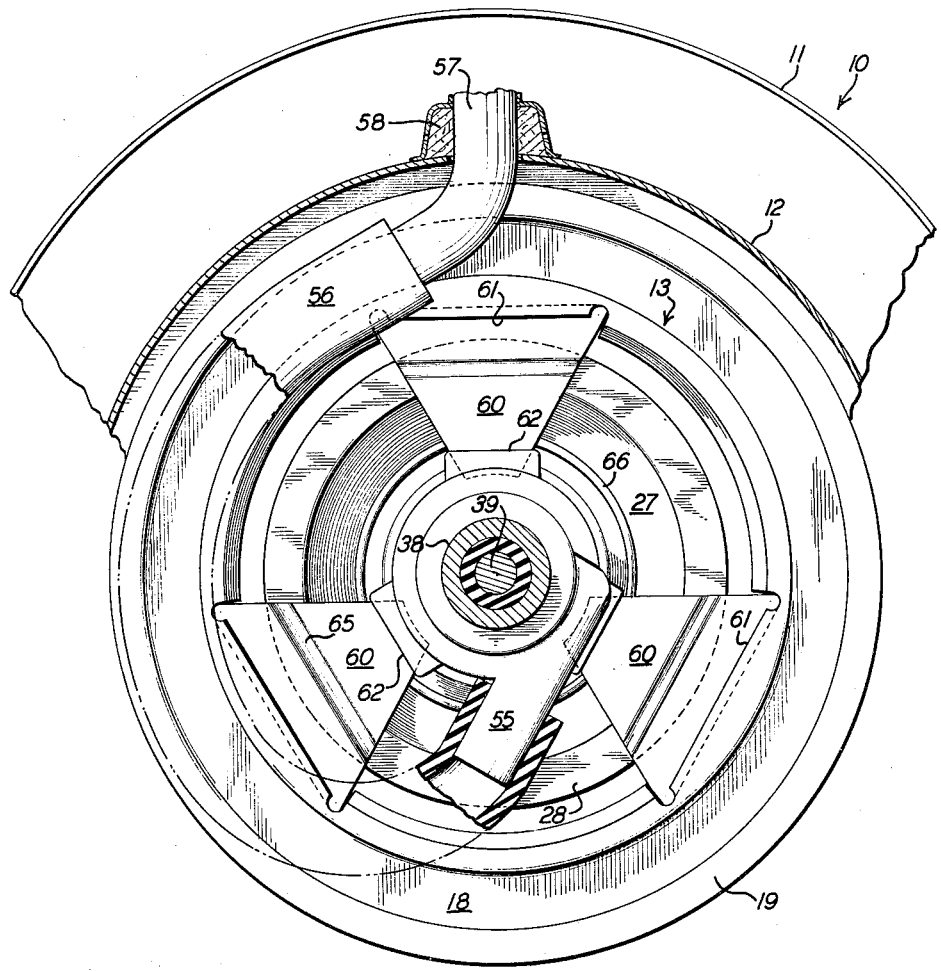
FIGURE 3 is a fragmentary section taken substantially on line 3—3 of FIGURE 2.

A plurality of radial reaction levers 60 is arranged within the plate 18. These levers are preferably shaped as shown in FIGURE 3 and have their wider radially outer ends engaging against inturned flanges 61 formed on the plate 18 to act as ribs engaging the radially outer ends of the levers 60, as shown in FIGURE 2. The radially inner ends of the levers engage ribs 62 formed on the valve housing 38. Intermediate their ends, the levers are provided with elongated ribs 65 normally spaced from the flange 28 of the plate 27, as shown in FIGURE 2. A spring 66 is arranged between the plate 27 and the levers 60 adjacent the radially inner ends thereof and serves to transmit a force to the valve housing 38 biasing it to its off position shown in FIGURE 2.

The hub 25 is formed with an air valve seat 70, normally disengaged from, but engageable with the valve 51, as described below. The space 71 within the valve seat 70 is in communication with the motor chamber 15, and the space 71, in the normal position of the parts, communicates with the chamber 14, as will be apparent. Thus the motor is normally atmospheric-pressure balanced.

The entire pressure responsive unit is biased to the off position shown by a return spring 75. It will be noted that the housing 12 is provided with a radial flange portion 76 to limit movement of the pressure responsive unit to off position, and in the absence of means to be described, the adjacent portion of the diaphragm 20 will engage the flange 76. In order to properly position the parts, a novel type of shim 77 may have one end arranged between the wall 76 and diaphragm 20. Such shim is provided with an outer longitudinally extending end 78 frictionally engaged in a rubber block 79 to maintain it in position. A shim 77 of different thickness may be employed to limit movement of the parts to their off positions to secure the advantageous cooperative relation of the parts, as discussed below.

*Operation*

Depression of the brake pedal to apply the brakes moves the valve housing 38 to the left in FIGURE 2 against solely the resistance of the spring 66. The push rod 39 moves to the left carrying with it the valve seat 46, and the biasing spring 52 for the valve 51 maintains the valve in engagement with the seat 46 until the valve engages the seat 70. The elements of the valve mechanism will now be in lap position. Further movement of the brake pedal moves the valve seat 46 away from the valve 51, and the space 71 will now communicate with the vacuum chamber 54 for the exhaustion of air from the motor chamber 15, such chamber obviously being cut off from the atmosphere upon the closing of the seat 70.

The pressure responsive unit 13 will now move to the left to operate the plunger 32 to displace fluid from the master cylinder to the wheel cylinders. The O-ring 48 initially prevents the full opening of the vacuum valve seat 46, this valve seat being only slightly opened when the O-ring is contacted. To effect further opening of the motor chamber 15 to the vacuum chamber 54, an additional force has to be exerted by the operator.

The movement of the valve housing to the left up to the point of engagement of the seat 46 with the O-ring 48 will not have caused the levers 60 to engage the flange 28. Attention is invited to the fact that the rib 65 and flange 28 are spaced normally such a distance that initial cracking of the valve seat 46 will take place without engagement of the rib 65 with the flange 28. Engagement of these elements with each other occurs when the vacuum valve seat 46 is fully open.

When the differential pressure acting on the pressure responsive unit 13 is such that the hydraulic line pressure expands the brake shoes, the diaphragm plate portion constituted by the convolutions 30 yields so that the flange 28 comes into contact with the fulcrum ribs 65 of the levers 60. In this connection, it will be noted that the pressure built up in the master cylinder chamber 34 resists movement of the radially inner portion of the pressure responsive unit, while the diaphragm 20 outwardly of the flange 19 is resisted only by the return spring 75. Accordingly, the radially outer portion of the pressure responsive unit moves to the left in FIGURE 2, under the conditions referred to, slightly ahead of the plate 18 and associated elements, thus flexing the convoluted portion 30 of the plate 21 as stated. Any subsequent further increase in the power of the motor to generate higher pressures in the wheel cylinders causes the levers 60 to rock on the fulcrum ribs 65 to exert pressure to the right against the ribs 62 of the valve housing 38, thus transmitting to the brake pedal reaction forces proportional to brake line pressures as determined by the lever ratios of the lever 60, as will be apparent.

When the brake pedal is released, obviously the spring 66 immediately returns the valve housing 38 to its normal position shown, such movement relative to the parts of the pressure responsive unit 13 being limited by the head 47. The seat 46 will engage the valve 51, disconnecting the chamber 15 from the vacuum chamber 54, and will move the valve 51 away from the seat 70 to restore communication between the chambers 14 and 15. Pressures in the chambers 14 and 15 thus will be balanced and the return spring 75 will return the parts to the normal positions shown. The use of the shim 77 provides for an accurate spacing of the rib 65 from the flange 28 in the normal positions of the parts to determine when positive reaction will be transmitted by the levers 60 through rod 39 to the brake pedal.

In the manufacture of the plate 21, the impression of the convolutions 30 renders the sheet metal in that area harder and more resistant, yet it is obvious that there is a limit to the permissible deflection of the plate 21. This limitation may be used to obviate the need for adjustment of the spring force of the plate 21. In the assembly of the unit, the gap between the flange 28 and lever ribs 65 may be greater than shown, due to the dimensional tolerances of the parts. In the initial power application, when the diaphragm 20 forces the plate 21 into the extreme position of the deflection of the convolutions 30, the convoluted portion of the plate 21 takes a set after the elastic limit has been reached, whereby after release of the power, the gap between the flange 28 and the fulcrum ribs 65 is reduced to a distance which would be the desired or adjusted distance to obtain the necessary resistant force of the plate 21 to yield when a certain line pressure is reached and the valve elements are in lap position. The maximum obtainable force of the resilient portion of the plate 21 depends, of course, on the thickness and temper of the sheet material, which may be proportioned to obtain the desired result.

Since the resilient area of the plate 21 is not preloaded, the plate begins to yield slightly as soon as differential pressure is produced in the motor. This yield has no effect until the lever fulcra engage the flange 28. Since this engagement depends on the position of the valve, the effect is that, after such engagement, any further valve movement to increase the brake application meets with increased resistance from the plate 21, forces being transmitted from the valve seat member 46 to the resilient area of the plate 21 through the O-ring 48 and hub 25. Such an action is desirable as it has a stabilizing effect in tending to prevent over-travel of the valve, and thereby reduces the chance of valve flutter.

From the foregoing, it will be apparent that the present construction provides the advantages of the transmission of reaction forces by lever means, in a mechanism which is characterized by simplicity and economy in manufacture and ease of assembly. Any need for adjustment is eliminated, and it is not necessary to use the conventional counter-reaction or transition springs to determine the point at which the levers become effective for transmitting positive reaction to the brake pedal.

It is to be understood that the form of the invention shown and described is to be taken as a preferred example of the same and that various changes in the shape, size and arrangement of the parts may be made as do not depart from the spirit of the invention or the scope of the appended claims.

I claim:

1. A booster motor mechanism comprising a casing, a pressure responsive unit therein dividing it to form a constant pressure chamber and a variable pressure chamber, said pressure responsive unit comprising radially inner and outer portions and resilient means connecting said portions to provide for relative axial movement of said radially inner and outer portions, a member to be operated connected to said radially inner portion, a valve mechanism normally balancing pressures in said chambers and operable for connecting one of said chambers to a pressure source to operate said pressure responsive unit, said valve mechanism comprising a manually operable unit, a reaction member connected to said radially inner portion of said pressure responsive unit, and reaction lever means engaging said manually operable unit and said radially outer portion of said pressure responsive unit and engageable by said reaction member to transmit reaction forces from said radially inner portion of said pressure responsive unit to said manually operable unit when said radially outer portion of said pressure responsive unit moves relative to said radially inner portion incident to resistance to movement of said member to be operated.

2. A booster motor mechanism comprising a casing, a pressure responsive unit therein dividing it to form a constant pressure chamber and a variable pressure chamber, said pressure responsive unit comprising radially inner and outer portions and annular resilient means connected at its radially inner and outer peripheries to said radially inner and outer portions of said pressure responsive unit to provide for relative axial movement of said radially inner and outer portions, a member to be operated connected to said radially inner portion, a valve mechanism normally balancing pressures in said chambers and operable for connecting one of said chambers to a pressure source to operate said pressure responsive unit, said valve mechanism comprising a manually operable unit, a reaction member connected to said radially inner portion of said pressure responsive unit, and reaction lever means engaging said manually operable unit and said radially outer portion of said pressure responsive unit and engageable by said reaction member to transmit reaction forces from said radially inner portion of said pressure responsive unit to said manually operable unit when said radially outer portion of said pressure responsive unit moves relative to said radially inner portion incident to resistance to movement of said member to be operated.

3. A booster motor mechanism comprising a casing, a pressure responsive unit therein dividing it to form a constant pressure chamber and a variable pressure chamber, said pressure responsive unit comprising radially inner and outer portions and resilient means connecting said portions to provide for relative axial movement of said radially inner and outer portions, a member to be operated connected to said radially inner portion, a valve mechanism normally balancing pressures in said chambers and operable for connecting one of said chambers to a pressure source to operate said pressure responsive unit, a manually operable unit, said valve mechanism comprising a first annular seat carried by said manually operable unit, a valve normally engaging said first seat, a second annular seat carried by said radially inner portion and normally disengaged from said valve to connect said chambers to each other, means biasing said valve toward said seats whereby movement of said manually operable unit a predetermined distance moves said first annular seat to engage said valve with said second annular seat and then disengage said first seat from said valve to connect said variable pressure chamber to a source of pressure to operate said pressure responsive unit, a reaction member carried by said radially inner portion of said pressure responsive unit, and lever means engaging respectively adjacent its radially inner and outer ends against said manually operable unit and said radially outer portion of said pressure responsive unit and engageable by said reaction member to transmit reaction forces from said radially inner portion of said pressure responsive unit to said manually operable unit when said radially outer portion of said pressure responsive unit moves relative to said radially inner portion incident to resistance to movement of said member to be operated.

4. A mechanism according to claim 3 provided with resilient means biasing said first seat in one direction to hold said valve in its normal position, said reaction member being normally spaced from said lever means a distance at least as great as said predetermined distance.

5. A mechanism according to claim 3 wherein said resilient annular member comprises a resilient plate portion shaped to form annular convolutions.

6. A mechanism according to claim 3 wherein said resilient annular member comprises a resilient plate portion shaped to form annular convolutions, and resilient means biasing said first seat in one direction to hold said valve in its normal position, said reaction member being normally spaced from said lever means a distance at least as great as said predetermined distance.

7. A booster motor mechanism comprising a casing, a pressure responsive unit therein dividing it to form a constant pressure chamber and a variable pressure chamber, said pressure responsive unit comprising annular radially inner and outer portions and an annular resilient plate portion annularly convoluted and connected at its radially inner and outer peripheries respectively to said radially inner and outer portions of said pressure responsive unit to provide for relative axial movement of said radially inner and outer portions, a member to be operated connected to said radially inner portion, a valve mechanism normally balancing pressures in said chambers and operable for connecting one of said chambers to a pressure source to operate said pressure responsive unit, said valve mechanism comprising a manually operable unit, a reaction member connected to said radially inner portion of said pressure responsive unit, and reaction lever means engaging said manually operable unit and said radially outer portion of said pressure responsive unit and engageable by said reaction member to transmit reaction forces from said radially inner portion of said pressure responsive unit to said manually operable unit when said radially outer portion of said pressure responsive unit moves relative to said radially inner portion incident to resistance to movement of said member to be operated.

8. A booster motor mechanism comprising a casing, a pressure responsive unit therein dividing it to form a constant pressure chamber and a variable pressure chamber, said pressure responsive unit comprising annular radially inner and outer portions and an annular resilient plate portion annularly convoluted and connected at its radially inner and outer peripheries respectively to said radially inner and outer portions of said pressure responsive unit to provide for relative axial movement of said radially inner and outer portions, a member to be operated connected to said radially inner portion, a manually operable unit coaxial with said motor, a valve mechanism comprising first and second annular valve seats carried respectively by said manually operable unit and by said radially inner portion of said pressure responsive unit, and a valve engageable with said seats and biased theretoward, said first seat normally engaging said valve and holding said valve away from said second seat to communicate said chambers with each other, said manually operable unit being movable a predetermined distance for engaging said valve with said second seat and disengaging said first seat from said valve to disconnect said chambers and connect said variable pressure chamber to a source of pressure, a reaction member connected to said radially inner portion of said pressure responsive unit, and reaction lever means engaging said manually operable unit and said radially outer portion of said pressure responsive unit and engageable by said reaction member to transmit reaction forces from said radially inner portion of said pressure responsive unit to said manually operable unit when said radially outer portion of said pressure responsive unit moves relative to said radially inner portion incident to resistance to movement of said member to be operated, said reaction member, when said valve is in said normal position, being spaced from said lever means a distance at least as great as said predetermined distance.

9. A mechanism according to claim 8 wherein said reaction member comprises an annular plate, said lever means comprising a plurality of radial levers engageable at their radially inner and outer ends respectively with said manually operable unit and said radially outer portion of said pressure responsive unit, said reaction plate being engageable with said levers intermediate the ends thereof.

10. A booster motor mechanism comprising a casing, a pressure responsive unit therein dividing it to form a constant pressure chamber and a variable pressure chamber, said pressure responsive unit comprising radially inner and outer portions and resilient means connecting said portions to provide for relative axial movement of said radially inner and outer portions, a member to be operated connected to said radially inner portion, a manually operable unit, a valve mechanism comprising a plurality of parts having normal positions balancing pressures in said chambers, one of said parts being carried by said manually operable unit, said manually operable unit being movable a predetermined distance to disconnect said chambers from each other and connect said variable pressure chamber to a pressure source to operate said pressure responsive unit, means biasing said valve mechanism parts to said normal position, a reaction member carried by said radially inner portion of said pressure responsive unit, lever means engaging at radially spaced points against said manually operable unit and said radially outer portion, said pressure responsive unit having a normal position in which said reaction member is spaced from said lever means a distance at least as great as said predetermined distance, said casing having a radial wall portion, and means carried by said radial wall portion and engageable with said radially outer portion of said pressure responsive unit to limit movement of the latter to said normal position.

11. A mechanism according to claim 10 wherein said means carried by said radial wall portion comprises a shim lying against said radial wall portion and engageable with said radially outer portion of said pressure responsive unit.

12. A mechanism according to claim 10 wherein said means carried by said radial wall portion comprises a shim lying against said radial wall portion and engageable with said radially outer portion of said pressure responsive unit, said shim having an end projecting through said radial wall portion, and a retaining member carried by said end of said shim externally of said casing and engaging against said wall portion.

13. A booster motor mechanism comprising a casing and a pressure responsive unit forming with said casing a variable pressure chamber, said pressure responsive unit comprising radially inner and outer portions and resilient means connecting said portions to provide for relative axial movement of said radially inner and outer portions, a member to be operated connected to said radially inner portion, a valve mechanism normally connecting said variable pressure chamber to one source of pressure and operable for connecting said variable pressure chamber to a source of different pressure to operate said pressure responsive unit, said valve mechanism comprising a manually operable unit, and reaction means for transmitting to said manually operable unit reaction forces created by relative movement between said radially inner and outer portions of said pressure responsive unit occurring incident to resistance to movement of said member to be operated.

14. A booster motor mechanism comprising a casing and a pressure responsive unit forming with said casing a variable pressure chamber, said pressure responsive unit comprising radially inner and outer portion and resilient means connecting said portions to provide for relative axial movement of said radially inner and outer portions, a member to be operated connected to said radially inner portion, a valve mechanism normally connecting said variable pressure chamber to one source of pressure and operable for connecting said variable pressure chamber to a source of different pressure to operate said pressure responsive unit, said valve mechanism comprising a manually operable unit, and reaction means comprising levers engaging said radially inner and outer portions of said pressure responsive unit and engaging said manually operable unit to transmit to said manually operable unit reaction forces created by relative movement between said radially inner and outer portions of said pressure responsive unit occurring incident to resistance to movement of said member to be operated.

15. A mechanism according to claim 14 wherein said manually operable unit has a normal position from which it is movable to an operative position for connecting said variable pressure chamber to said source of different pressure, said manually operable unit being movable from its normal position independently of said radially inner portion of said pressure responsive unit, and resilient means carried by said inner portion of said pressure responsive unit and arranged in the path of travel of said manually operable unit to cushion movement thereof to said operative position.

16. A mechanism according to claim 14 wherein said manually operable unit has a normal position from which it is movable to an operative position for connecting said variable pressure chamber to said source of different pressure, said manually operable unit being movable from its normal position independently of said radially inner portion of said pressure responsive unit, and an O-ring carried by said inner portion of said pressure responsive unit and engageable with said manually operable unit just before the latter reaches said operative position.

References Cited in the file of this patent

UNITED STATES PATENTS

| | | |
|---|---|---|
| 2,826,041 | Rike | Mar. 11, 1958 |
| 2,826,042 | Rike et al. | Mar. 11, 1958 |
| 2,828,719 | Ayers | Apr. 1, 1958 |
| 2,867,193 | Ayers | Jan. 6, 1959 |
| 2,876,627 | Ayers | Mar. 10, 1959 |